United States Patent
Chin et al.

(10) Patent No.: US 12,079,376 B2
(45) Date of Patent: Sep. 3, 2024

(54) SYSTEM AND METHOD FOR HARDWARE MANAGEMENT THROUGH OPERATION UPDATE

(71) Applicant: Dell Products L.P., Round Rock, TX (US)

(72) Inventors: Jordan Chin, Austin, TX (US); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 17/895,395

(22) Filed: Aug. 25, 2022

(65) Prior Publication Data

US 2024/0070328 A1 Feb. 29, 2024

(51) Int. Cl.
G06F 21/71 (2013.01)
G06F 9/30 (2018.01)
G06F 9/4401 (2018.01)
G06F 21/78 (2013.01)

(52) U.S. Cl.
CPC .......... *G06F 21/71* (2013.01); *G06F 9/30101* (2013.01); *G06F 9/4401* (2013.01); *G06F 21/78* (2013.01)

(58) Field of Classification Search
CPC .... G06F 21/71; G06F 9/30101; G06F 9/4401; G06F 21/78; G06F 21/575
See application file for complete search history.

(56) References Cited

U.S. PATENT DOCUMENTS

| | | | | |
|---|---|---|---|---|
| 9,055,057 | B1 * | 6/2015 | Rao | H04L 63/168 |
| 9,536,086 | B2 * | 1/2017 | Furtner | G06F 21/755 |
| 10,169,251 | B1 * | 1/2019 | Whelihan | G06F 21/00 |
| 11,301,235 | B1 * | 4/2022 | Erdogan | G06F 8/65 |
| 2006/0161784 | A1 * | 7/2006 | Hunter | G06F 21/575 |
| | | | | 713/182 |
| 2017/0168902 | A1 * | 6/2017 | Branco | G06F 21/554 |
| 2019/0325139 | A1 * | 10/2019 | Dewan | H04L 41/082 |
| 2021/0157563 | A1 * | 5/2021 | Duval | G06F 8/658 |
| 2022/0086007 | A1 * | 3/2022 | Haskell | H04L 9/0877 |
| 2023/0130694 | A1 * | 4/2023 | Savage | H04L 9/3263 |
| | | | | 713/2 |

FOREIGN PATENT DOCUMENTS

| | | | | |
|---|---|---|---|---|
| CN | 108427888 A | * | 8/2018 | |
| CN | 112118137 A | * | 12/2020 | ............ G06F 8/65 |
| EP | 2897079 A1 | * | 7/2015 | ............ G06F 21/53 |
| EP | 3084614 B1 | * | 3/2020 | ......... G06F 12/0802 |
| WO | WO-2019027471 A1 | * | 2/2019 | ............ G06F 21/44 |
| WO | WO-2021057166 A1 | * | 4/2021 | ......... G06F 15/7867 |

* cited by examiner

*Primary Examiner* — Christopher A Revak
(74) *Attorney, Agent, or Firm* — Womble Bond Dickinson (US) LLP

(57) ABSTRACT

Methods and systems for managing the operation of data processing systems are disclosed. A data processing system may include a computing device that may perform various operations using hardware devices. The operation of the hardware devices may be updated by storing data in secure locations of the hardware devices. To store data in the secure locations, a delayed write may be stored in an unsecure storage location of a hardware devices during an unsecure phase of operation of a data processing system. Once the data processing system enters a more secure phase of operation, the delayed write may be validated and used to update the data in the secure locations during the more secure phase of operation of the data processing system.

20 Claims, 9 Drawing Sheets

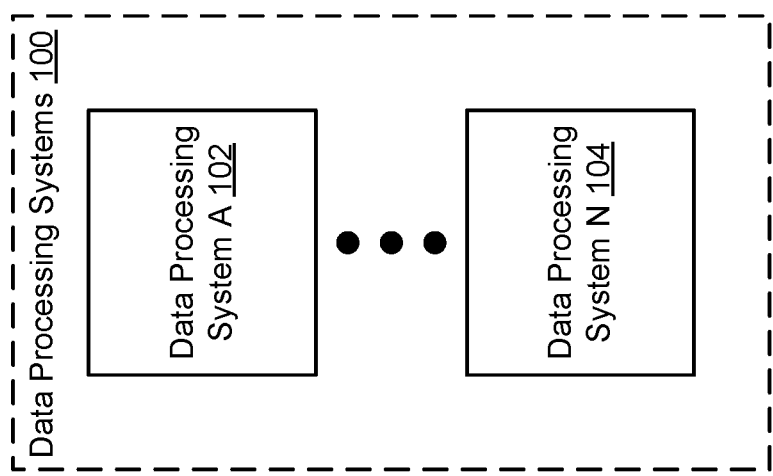

SYSTEM AND METHOD FOR HARDWARE MANAGEMENT THROUGH OPERATION UPDATE

FIELD OF THE EMBODIMENTS

Embodiments disclosed herein relate generally to hardware management. More particularly, embodiments disclosed herein relate to systems and methods to securely update the operation of hardware devices.

BACKGROUND

Computing devices may store data and use stored data, as well as perform various computations during operation. For example, computing devices may utilize data when providing computer implemented services and may perform various computations when providing the computer implemented services. The operations may be performed using various hardware devices of a computing device.

BRIEF DESCRIPTION OF THE DRAWINGS

Embodiments are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
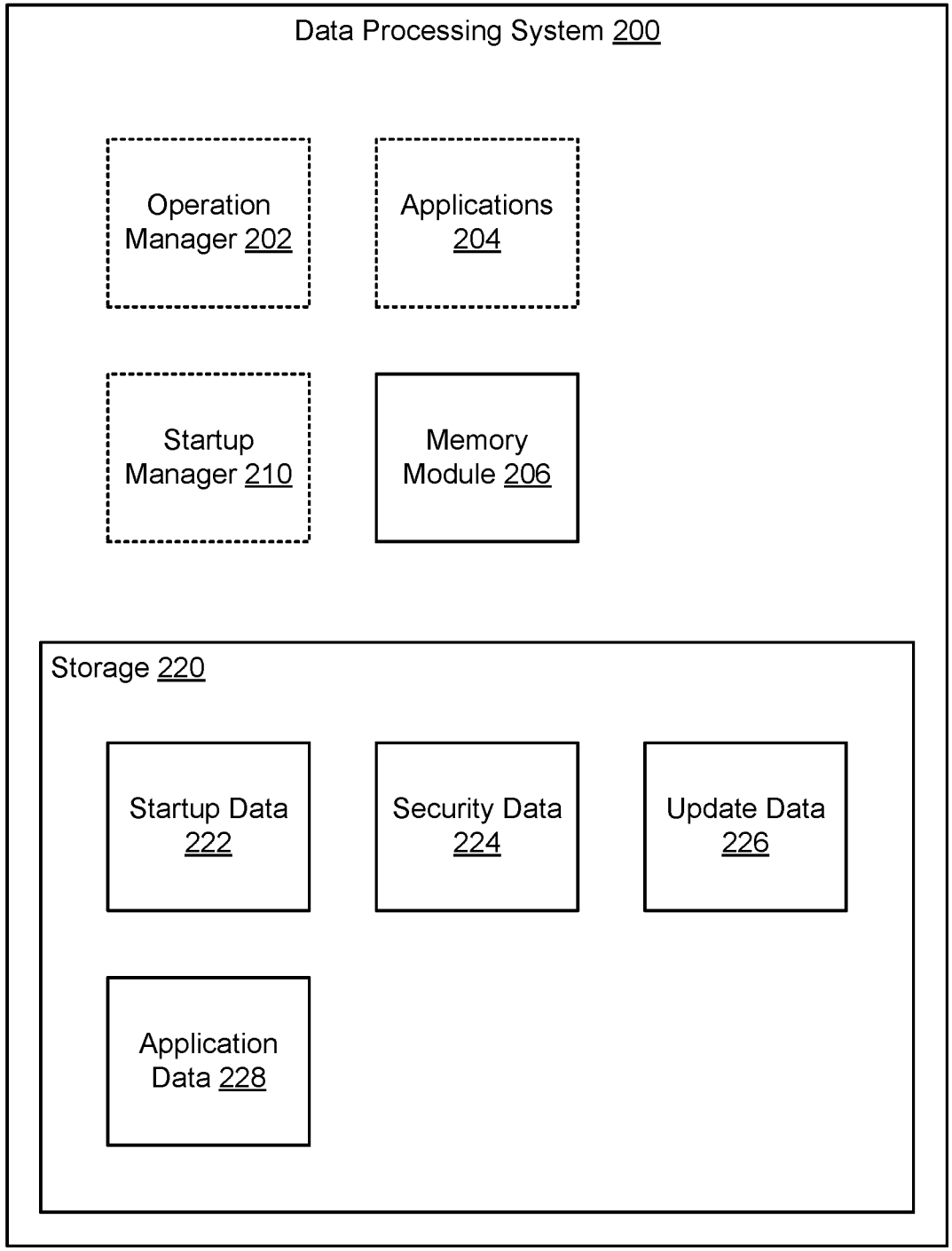
FIG. 2A shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing system. A data processing system may include a computing device that may operate in various manners (e.g., operating states or modes). The data processing system may include various hardware devices.

To operate in the various manners, the hardware devices may be expected to perform various functionalities in predetermined manners. If a hardware device does not perform its functionalities in the predetermined manners, then the hardware device may be impaired which may in turn impair the operation of the host data processing system.

To reduce the likelihood of impairment of a data processing system due to a hardware device not performing functionalities in the predetermined manner, the operation of the hardware devices may be updated by modifying various parameters that define how the hardware device operates.

To facilitate modification of the parameters, a process may be performed where a delayed write is stored in storage of the hardware device during a runtime environment which may not be secure and during which access to the parameters of that device the operation of the hardware device is restricted (or prevented entirely). Once placed in the storage of the hardware device, the data processing system may enter a more secure operating environment such as a startup environment in which various functionalities of the data processing system are limited and only validated instructions are executed.

During the more secure operating environment, a startup management entity may ascertain whether delayed writes stored in storage of hardware devices should be implemented. For example, various validation processes for the delayed write(s) may be performed.

Valid delayed writes may be implemented (e.g., written to registers or other secure portions of the hardware devices in which parameters that define the operation of the memory module are stored) and invalid delayed writes may be discarded. Once implemented, the hardware devices may be (re)initialized to cause changes from the implemented delayed writes to take effect.

By doing so, embodiments disclosed herein may provide a method for updating the operation of hardware devices in a secure manner that does not rely on the presence of management controllers (or other out-of-band components) or availability of side-band or out of band communications for device management purposes. Thus, embodiments disclosed herein may provide a data processing system the capability to update over time while proactively addressing security threats that may otherwise be introduced by such update processes.

In an embodiment, a computer-implemented method for managing operation of a data processing system is provided. The method may include identifying a first startup of a data processing system; during the first startup, generating first security data; following the first startup and handing off management of the data processing system to a management entity, obtaining update data for a memory module of the data processing system; while the data processing system is managed by the management entity, executing a write operation using the update data and the first security data to place a delayed write in storage of the memory module; after the delayed write is in storage of the memory module, identifying a second startup of the data processing system that terminates management of the data processing system by the management entity; during the second startup: generating second security data; making a determination regarding whether the delayed write is valid using the second security data and a copy of the first security data in the storage of the memory module; in a first instance of the determination where the delayed write is valid: initiating execution of the delayed write to update a secure register of the memory module using the update data; and in a second instance of the determination where the delayed write is invalid: clearing the delayed write from the memory module without updating the secure register.

Executing a write operation may include writing a data chunk to a shadow register of the memory module, the secure register being in a secure state after completion of the first startup.

The secure register may be in a writable state during at least a portion of the first startup and the second startup.

The data chunk may specify an operation parameter for the memory module, and updating the secure register using the delayed write updates operation of the memory module based on the operation parameter.

The computer-implemented method may also include: further in the first instance of the determination where the delayed write is valid: performing a restart of the memory module to implement the operation parameter.

The secure register may include parameters that define operational characteristics of the memory module.

Making the determination may include comparing the second security data and the copy of the first security data.

The second security data may include one selected from a group consisting of a key, a certificate, and a hash value.

During the first startup and the second startup, the data processing system may execute verified (e.g., validated) computer code.

When managed by the management entity, the data processing system may execute at least one portion of unverified computer code.

Initiating the execution of the delayed write to update the secure register of the memory module using the update data may include transitioning the secure register from a locked state to a writable state; while the secure register is in the writable state, writing to the secure register using the update data; and after the writing to the secure register, clearing the delayed write from the storage.

The management entity may include an operating system.

The first startup and the second startup may be managed by a startup management entity.

The startup management entity may include a basic input output system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include one or more data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may host applications that provide these (and/or other) computer implemented services. The applications (or other types of executing entities) may presume (and/or may require for proper operation of the applications) that a data processing system hosting the application is operating in a predetermined manner. The predetermined manner of operation may include, for example, (i) operation of various hardware components in predetermined manners, (ii) hosting of an operating system, drivers, and/or other type of management entities that mediate, facilitate, or otherwise operate in a manner which enables the applications to operate (e.g., by providing abstracted access to hardware resources used in the execution of the applications), and/or (iii) other criteria.

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system or other type of management entity that facilitates execution of applications (and/or operation of certain types of hardware devices such as application specific integrated circuits that may provide certain functions without need for a software layer).

These actions may include, for example, inventorying the hardware components hosted by a host device, loading drivers or other software components, configuring hardware and/or software components, etc. As part of the startup process, the management entity may also load code, configuration settings, and/or other data corresponding to an operating system (and/or other management entity types and/or other types of executing entities) to memory. This and/or other types of data may be stored in persistent storage thereby allowing it to be read into memory during the startup.

Once the data is loaded into memory, the data processing system may initiate execution of code (e.g., computer instructions) included in the data in memory to begin operation of the operating system or other types of management entities (e.g., handoff management of the data processing and transition from a startup phase of operation to a runtime phase of operation of the data processing system). The executing code may utilize configuration settings and/or other information also included in the data in memory.

After the data processing system hosts the operating system and/or performs other types of predetermined operations as part of a startup, discussed above, then the applications may begin to provide the computer implemented services.

Similarly to hosting variously entities to enter the predetermined operating state, each of the hardware devices (e.g., processors, memory modules, etc.) of data processing systems 100 may also need to operate in accordance with a prescribed manner. The prescribed manner may include, for example, drawing prescribed amounts of power, operating within expected voltage levels, meeting timing requirements for signaling (e.g., communicating with other components), and/or other characteristics regarding the operation of a hardware component. When operating in the prescribed manner, the hardware devices of the data processing systems may complete various operations as requested by the application (e.g., through the abstracted access provided by the management entities).

However, the hardware devices may fail to complete performance of the various operations if the hardware components do not operate in the prescribed manner. For example, if a hardware device draws more power than prescribed, fails to adhere to communication timing conventions, and/or otherwise operates in a manner different from that expected by the host data processing system, then the hardware device may not function as expected and prevent completion of various operations.

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 may update the operation of their hardware components to conform the operation of the hardware components to an expected manner of operation.

To conform the operation of the hardware components to the expected manner of operation, data processing systems 100 may include functionality to (i) during runtime, obtain an update for a hardware device, (ii) during the runtime, execute a delayed write operation for the hardware device based on the update, and (iii) during a startup following the runtime, implementing the delayed write to update content of a secure register of the hardware device. During runtime, the secure register may be locked while during a startup the secure register may be unlockable thereby facilitating modification of the contents of the secure register. In this manner, updates to hardware devices may be obtained during runtime while a data processing system has a higher level of functionality (e.g., may be connected to other devices, has more functionalities enabled than during a startup, etc.) and the updates may be executed during startups while the data processing system is the more secure thereby providing for update flexibility (e.g., that does not rely on out-of-band mechanisms for hardware device management) while maintaining system security.

To further improve security of the process of implementing an update for operation of a hardware device, cryptographic data may be used to validate that a delayed write should be implemented. To do so, data processing systems 100 may also include functionality to (i) during a first startup, generate a chunk of cryptographic data, (ii) during the runtime, write the cryptographic data (or other data structures based on the cryptographic data chunk) to the hardware device along with the update, and (iii) during a follow-up startup, generate a second chunk of cryptographic data and use it (along with the already-written cryptographic data chunk) to ascertain whether a delayed write present in a hardware device should be executed. If it is determined that the delayed write should be executed, then the delayed write may be implemented during the following startup to modify data in the secure register of the hardware device based on the update. By doing so, the host data processing system may ensure that only delayed write that it instantiated are executed by the hardware device.

For example, consider a scenario where a hardware device is a memory module. The memory module may include some number of secure registers that store persistent data, and a sub-set of those secure registers may store data that define operational parameters for the memory module. At least one of the operational parameters may be problematic and may place the memory module at risk of early failure. To address the risk presented by the operational parameter, the operational parameter may be modified. Modification of the operational parameters may modify the operation of the memory module.

To reduce the likelihood of compromise due to certain types of malicious attacks that may attempt to modify the operation of the memory module, the secure registers may be locked during runtime of a host data processing system but may be placed in a writable state during startups. However, during startups the host data processing system may lack functionality to obtain updates for the memory module. For example, only a limited amount of functionality of the host data processing system may be enabled during startups to reduce risk of compromise.

To facilitate updating while managing security, the data processing system may generate a cryptographic data chunk (e.g., a certificate, a hash, a key, etc.) during startup and use that cryptographic data chunk to validate delayed writes during subsequently performed startup. For example, the cryptographic data chunk may act as a signature that allows the host data processing system to trust delayed writes encountered during startups.

Once the security data chunk is generated, the data processing system may handoff to runtime during which an update may be obtained (e.g., by receiving it from an update service). The update and security data chunk may then be used to execute a delayed write operation for the memory module that may be subsequently verified by the host data processing system.

During a subsequent restart, the host data processing system generate a second chunk of cryptographic data (e.g., second security data). The second chunk of cryptographic data may be used (e.g., compared to or through performance of various operation) with the delayed write to ascertain whether the delayed write should be implemented. For example, the cryptographic data chunk (e.g., stored in the memory module) may be compared to the second cryptographic data chunk to ascertain whether the corresponding delayed write should be implemented. Refer to FIGS. 2C-2D for additional details regarding validation and implementation of delayed writes.

Any of data processing systems 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4. For additional details regarding data processing systems 100, refer to FIG. 2A.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Turning to FIG. 2A, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may perform startups to enter predetermined operating states, may update their operation of its components (e.g., memory module 206) to improve the likelihood of successful operation, and/or may perform other operations.

To perform startups, data processing system 200 may host startup data 222 in storage 220. Startup data 222 may include, for example, code bases, configuration settings, cryptographic data usable to validate the code base and/or configuration settings, and/or other types of information usable to both validate startup data 222 and perform one or more startups.

When a startup is performed, security data 224 may be generated. Security data 224 may include, for example, certificates, signatures, hashes, and/or other types of cryptographic data. Security data may facilitate validation of delayed writes and/or other data structures. To generate security data 224, code from startup data 222 may be executed. When the code is executed, a cryptographic algorithm may be performed which may generate security data 224.

The startup performed using the code base in startup data 222 may result in startup manager 210 (e.g., a basic input output system or similar type of entity) being instantiated during the startup. Startup manager 210 may manage performance of the startup. As part of managing the performance of the startup, startup manager 210 may (i) generate security data 224 and/or (ii) ascertain whether there are any delayed writes in hardware devices of data processing system 200. If no delayed writes are found, security data 224 may be handed off to an operation manager 202 (discussed below) and used to validate delayed writes. If a delayed write is found, then security data 224 may be used to validate the delayed write.

Once a startup is complete, management of data processing system 200 may be handed off to operation manager 202. Operation manager 202 may generally manage the operation of data processing system 200. Operation manager 202 may include, for example, an operating system, drivers, and/or other types of management entities.

As part of managing data processing system 200, operation manager 202 may receive and initiate completion of updates for various hardware devices of data processing system 200. For example, when an update for memory module 206 is obtained (e.g., received from a management service or other device), operation manager 202 may write a copy of the update and a copy of security data 224 to storage of memory module 206 as a delayed write. The delayed write may indicate that the update (e.g., update data 226) is to be applied to a secure register in which parameters that define the operation of memory module 206 are stored. The storage may include a register or other type of non-transitory storage. During a subsequent startup, the delayed write may be validated using the copy of security data 224 stored in the non-transitory storage of memory module 206.

Memory module 206 may be a physical device that contributes memory resources to data processing system 200. For example, memory module 206 may be operably connected to a processor and/or other resources of data processing system 200.

Memory module 206 may include (i) hardware for transitory storage, and (ii) hardware for persistent storage. Operation parameters may be stored in the persistent storage and used to define the operation of memory module 206.

Generally, the non-transitory storage of memory module 206 may be lockable such that the parameters used to define the operation of memory module 206 may not be modified during runtime of data processing system 200 (e.g., after management of data processing system 200 is handed to operation manager 202). Prior to handoff, the startup processes performed by startup manager 210 may use validated code such that all (or substantially all) of the operations of data processing system 200 are validated. In contrast, after handoff other various operations may be performed that may not be validated (e.g., third party code). Consequently, to prevent undesired modification of the parameters that define the operation of memory module 206, the non-transitory storage (or at least the portion in which the parameters are stored) may be locked for writing during runtime and may be unlockable during startup such that the parameters defining the operation of memory module 206 may be modified while data processing system 200 is operating in a more secure manner when compared to runtime following completion of startups.

Figure 2B:
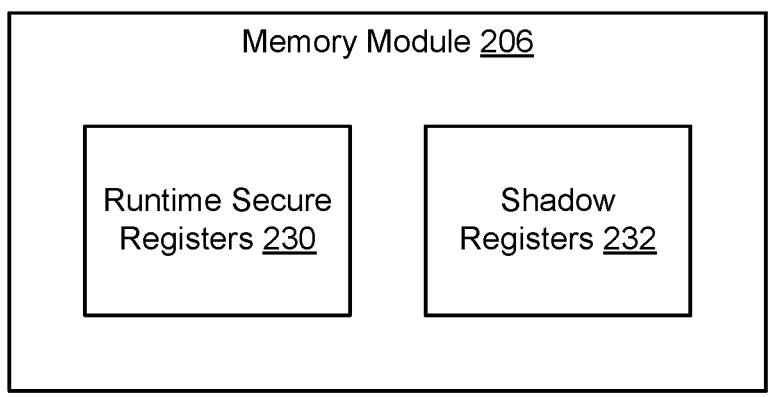
FIG. 2B shows a block diagram illustrating a memory module in accordance with an embodiment.
Figure 2C:
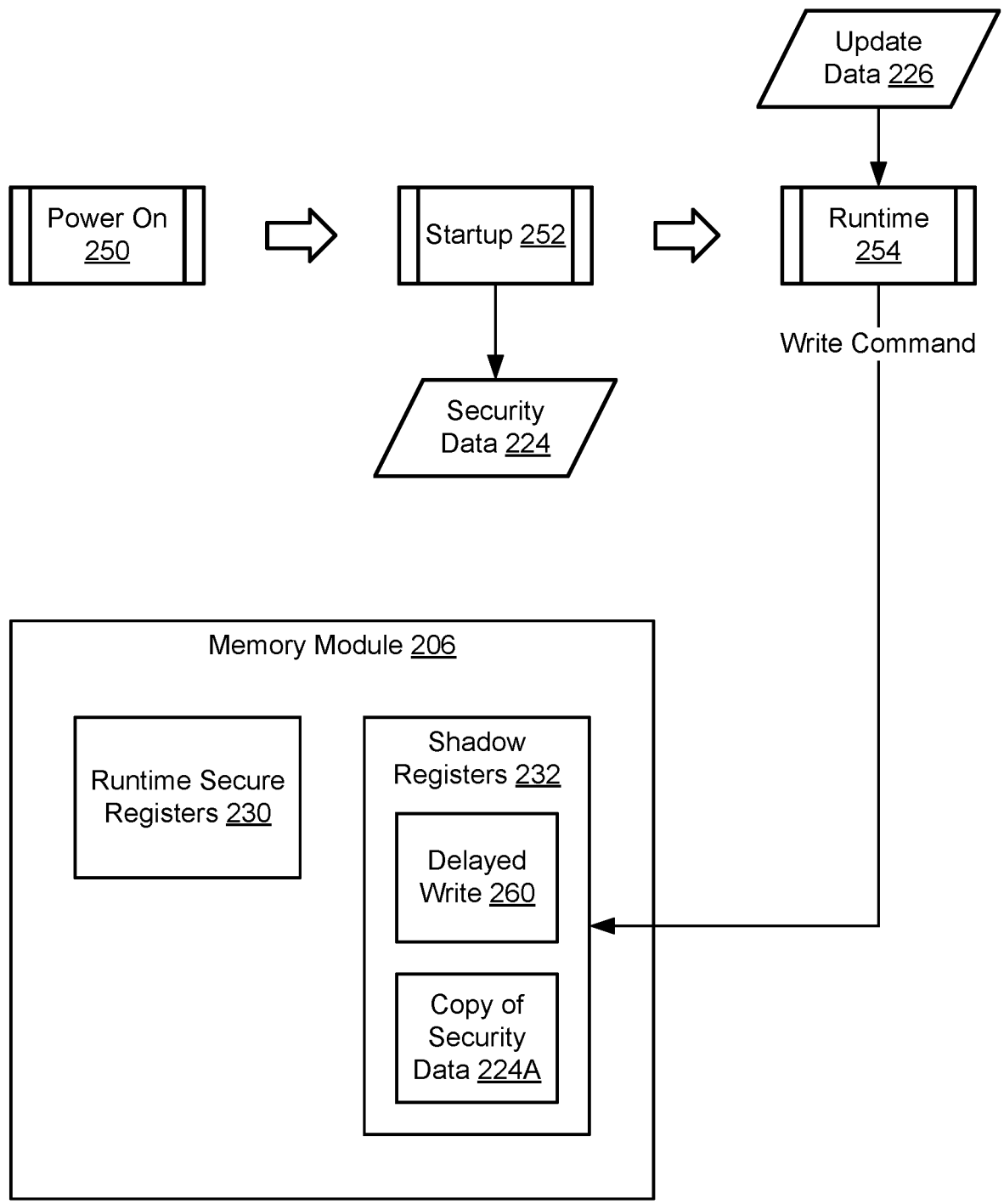
FIGS. 2C-E show diagrams illustrating an update process and data flows during the update process in accordance with an embodiment.
Figure 2D:
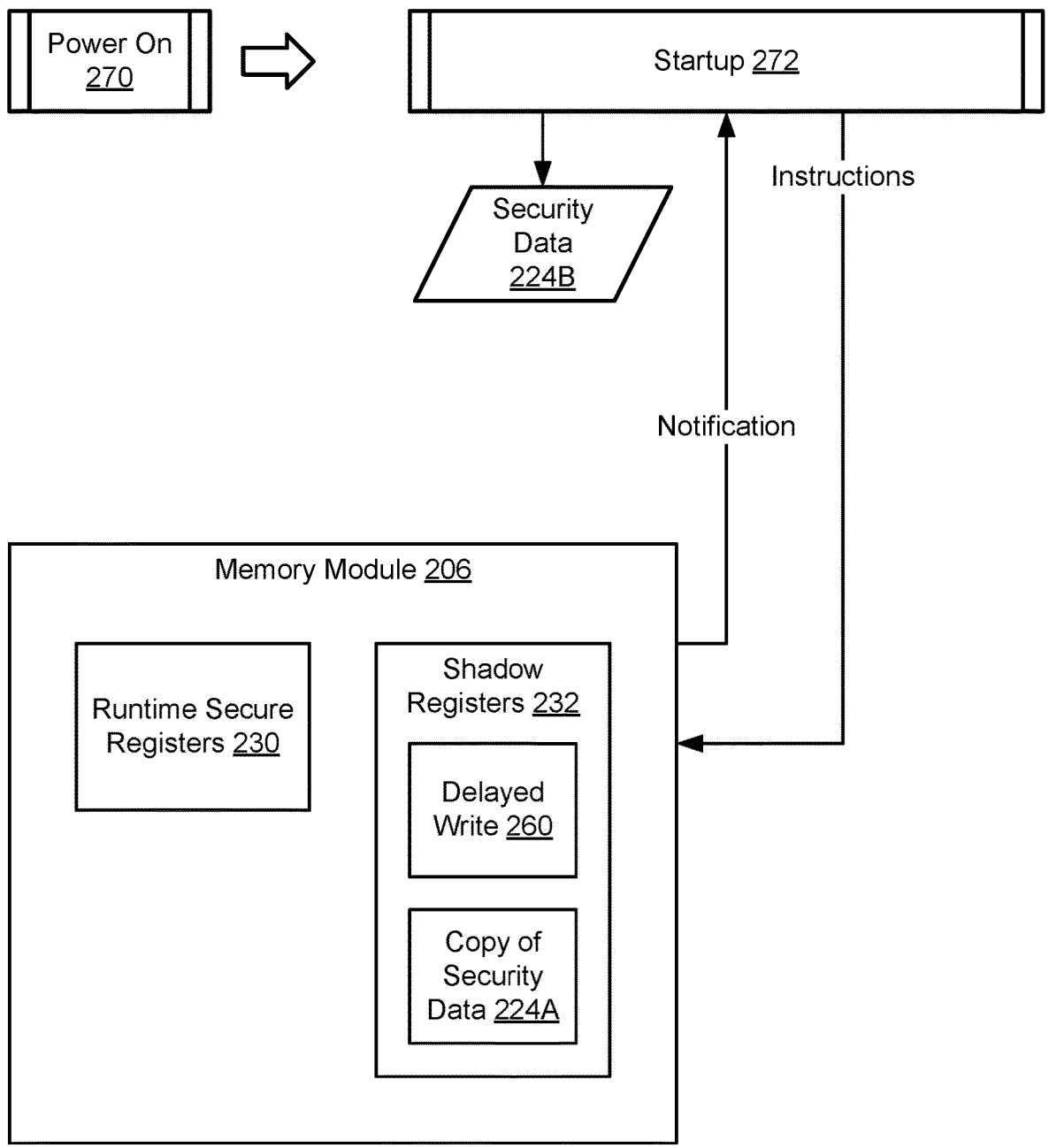

For additional details regarding memory module 206, refer to FIG. 2B and the corresponding discussion.

Applications 204 may provide desired computer implemented services. When doing so, applications 204 may generate, store, modify, read, and/or otherwise use application data 228 stored in storage 220. Applications 204 may only be present after startups are performed that cause operation manager 202 to provide certain functionalities (e.g., abstracted resource management provided by an operating system, drivers, etc.).

Generally, operation manager 202 and applications 204 may provide their functionalities while data processing system 200 operates in the predetermined manner during runtime. For example, prior to completion of a startup, operation manager 202 and applications 204 may not provide their respective functionalities (they may not be executing). In FIG. 2A, operation manager 202, applications 204, and startup manager 210 are drawn with dashed outlines because these entities may or may not be executing depending on whether a startup is being performed (e.g., only startup manager 210 may be executing) or a startup is completed (e.g., operation manager 202 and applications 204 may be executing, startup manager 210 may or may not be executing).

Startup manager 210 may provide startup management functionality. Startup management functionality may include performing startups using startup data 222, generating security data 224 using startup data 222, ascertaining the validity of pending writes and/or implementing valid pending writes, and/or performing other processes to place data processing system 200 in a state conducive to providing computer implemented services.

In an embodiment, one or more of operation manager 202, applications 204, and startup manager 210 are implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 202, applications 204, and startup manager 210. One or more of operation manager 202, applications 204, and startup manager 210 may be implemented using other types of hardware devices without departing from embodiments disclosed herein.

In an embodiment, one or more of operation manager 202, applications 204, and startup manager 210 is implemented using a processor adapted to execute computing code stored on a persistent storage that when executed by the processor performs the functionality of one or more of operation manager 202, applications 204, and startup manager 210 discussed throughout this application. The processor may be a hardware processor including circuitry such as, for example, a central processing unit or a microcontroller. The processor may be other types of hardware devices for processing digital information without departing from embodiments disclosed herein.

Figure 2E:
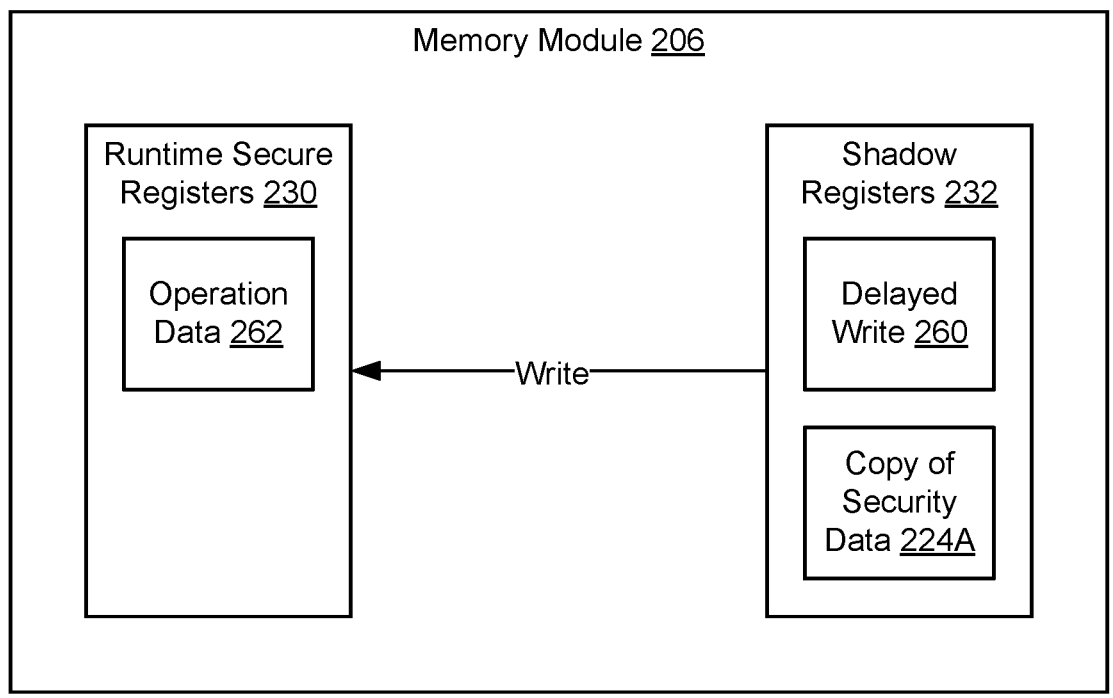
Figure 3A:
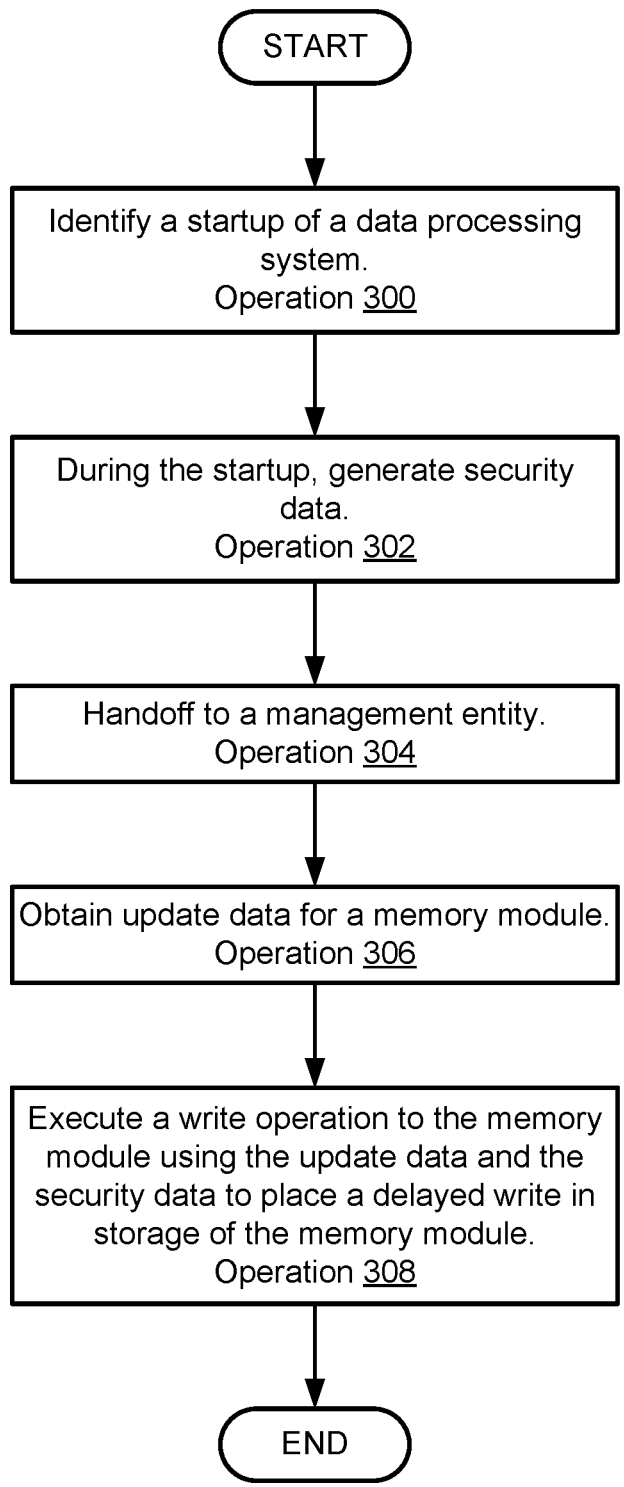
FIG. 3A shows a flow diagram illustrating a method of storing a delayed write in a hardware device for update purposes in accordance with an embodiment.
Figure 3B:
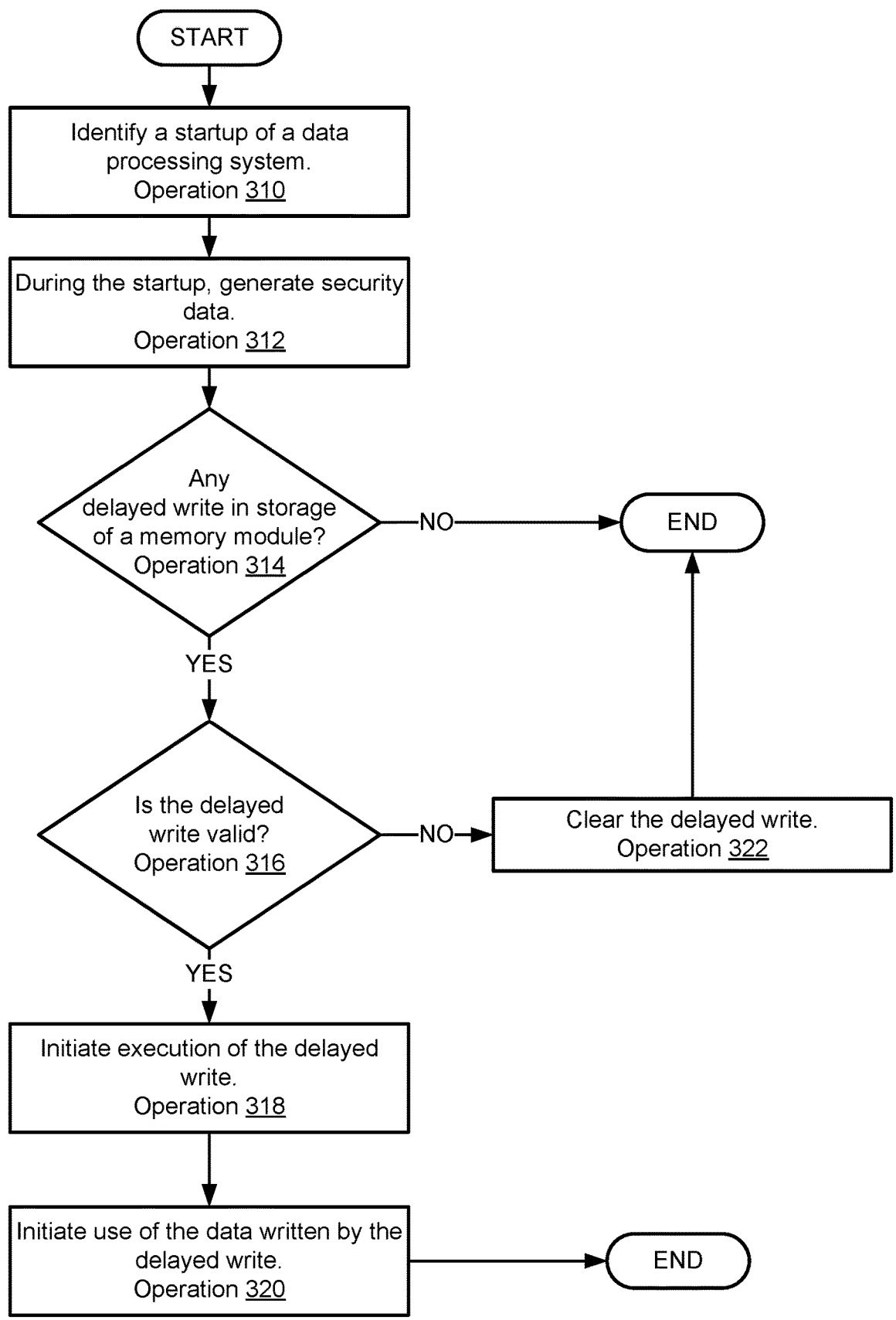
FIG. 3B shows a flow diagram illustrating a method of using a delayed write in a hardware device to update operation of the hardware device in accordance with an embodiment.

When providing their functionalities, one or more of operation manager 202, applications 204, and startup manager 210 may perform all, or a portion, of the methods illustrated in FIGS. 3A-3B, and/or the operations shown in FIGS. 2C-2E.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

In an embodiment, storage 220 is implemented with a secured storage. Secured storage may include a hardware storage device for storing data. Access to secured storage may be limited. For example, secured storage may be implemented with a solid-state storage device operably connected via a serial peripheral interface bus to a processor of data processing system 200. Upon startup, data processing system 200 may cause the information in the solid-state storage device to be used to perform startup of data processing system 200. For example, instructions (e.g., computer code) corresponding to startup manager 210 may be stored in startup data 222 and/or cryptographic data usable to validate the instructions may be stored in startup data 222. The contents of the solid-state storage device may be generally inaccessible without providing various credentials such as passwords.

Startup data 222 may include any type and quantity of data for performing any number and type of startups of data processing system 200. These startups may be secured startups by virtue of the secure storage and cryptographic data.

In an embodiment, storage 220 is implemented with a general storage. The general storage may include any number and types of storage devices. The general storage may be generally accessible. For example, operation manager 202 may manage and provide access to data stored in the general storage, including storing of application data 228, security data 224, and/or update data 226 in the general storage.

Application data 228 may include any type and quantity of data used by applications 204 to provide their respective services.

While illustrated in FIG. 2A as including a limited number of specific components, a data processing system in accordance with an embodiment may include fewer, additional, and/or different components than shown herein. Further, while various data structures have been illustrated and described in FIG. 2A, any of the data structures may be implemented with various types of structures (e.g., lists, tables, linked lists, databases, etc.), may be stored in different locations, and/or may be spanned across any number of devices without departing from embodiments disclosed herein.

Turning to FIG. 2B, a diagram of memory module 206 in accordance with an embodiment is shown. As discussed above, memory module 206 may provide memory resources used by applications and/or other entities when computer-implemented services are provided. To provide its functionality, memory module 206 may include runtime secure registers 230 and shadow registers 232.

Both of these types of registers may be implemented using non-transitory onboard storage (e.g., solid state storage of memory module 206). Runtime secure registers 230 may include data that defines how memory module 206 operates such as, for example, how much power is drawn by memory module 206, voltage levels implemented for signalizing purposes, and/or other types of information that may configure the operation of memory module 206. Runtime secure registers 230 may be selectively locked so that data may not be written to these registers. For example, various bits may be set that may lock runtime secure registers 230 until runtime secure registers 230 are unlocked (e.g., by providing a passcode, setting certain bits, etc.).

In contrast, shadow registers 232 may be writable during runtime so that delayed writes and/or other types of information may be persistently stored in memory module 206. For example, shadow registers 232 may be a portion of runtime secure registers 230 left unlocked following completion of a startup. In this manner, the registers that store parameters or other information that define how memory module 206 operates may be locked during runtime while shadow registers 232 may be unlocked thereby facilitate storage of information that survives power cycling/restarting of a host data processing system but that is not used to define the operation of memory module 206.

While illustrated in FIG. 2B with a limited number of specific components, a memory module may include additional, fewer, and/or different components without departing from embodiments disclosed herein.

As discussed above, data processing systems may include functionality to update the operation of their hardware devices. FIGS. 2C-2E show diagrams illustrating data flows and operations that may be performed to update operation of a hardware device such as memory module 206 in accordance with an embodiment.

Turning to FIG. 2C, a first data flow diagram in accordance with an embodiment is shown. In the diagram, a process of performing a startup of a data processing system is shown. As seen in the diagram, the processes may include power on 250, startup 252, and runtime 254.

Following power on 250 (e.g., beginning of a startup due to a power cycling, powering, or other condition) of the data processing system, startup 252 may be performed. Startup 252 may include loading various types of data into memory, inventorying hardware components, and/or performing other processes to prepare for entry into runtime 254. Additionally, during startup 252, security data 224 may be generated. Security data 224 may be generated using a cryptographic algorithm, or may be obtained through other processes (e.g., receiving from another device). Security data 224 may be stored for later use.

Prior to completion of startup 252, the data processing system may limit its functionality to reduce the likelihood of startup 252 being compromised (e.g., through execution of malicious computer code, storing of malicious data, etc.). For example, only signed computer code may be executed, various functionalities may be disabled (e.g., universal serial bus, network connectivity, etc.), etc.

Once startup 252 is complete, management of the data processing system may be handed off to one or more management entities (e.g., an operating system) which may then orchestrate runtime 254. During runtime 254 various computer-implemented services may be provided by the data processing system. As part of the provided services, update data 226 may be obtained. Update data 226 may be usable to modify the operation of memory module 206.

For example, if memory module 206 includes parameters stored in runtime secure registers 230 that may hinder successful operation of memory module 206, then the operation of memory module 206 may be hindered until the parameters are modified such that the parameters no longer hinder the successful operation of memory module 206.

However, during runtime 254 runtime secure registers 230 may be locked for writing. For example, during startup 252 certain bits may be set or other modifications may be made to memory module 206 that prevent modification of the data stored in runtime secure registers 230. Thus, the parameters stored in runtime secure registers 230 may not be accessible when update data 226 is obtained.

To facilitate modification of the parameters in memory module 206 using update data 226, the management entities hosted by the data processing system during runtime 254 may write data to shadow registers 232 of memory module 206. In contrast to runtime secure registers, shadow registers 232 may be unlocked and writable (but may not include information used to define the operation of memory module 206).

The data written to shadow registers 232 may include delayed write 260 and a copy of security data 224A. Delayed write 260 may include a copy of (all or a portion) update data 226 and/or information based on update data 226. For example, update data 226 may specify new values for parameters that define the operation of memory module 206. The delayed write may be directed to various registers of runtime secure registers 230.

Additionally, a copy of security data 224A may also be stored in shadow registers 232. As will be discussed below, the copy of security data 224A may be used to validate delayed write 260 at a later point in time.

Turning to FIG. 2D, a second data flow diagram in accordance with an embodiment is shown. In the diagram, a process of performing a second startup of a data processing system is shown. The second startup may be performed after the startup shown in FIG. 2C. As seen in the diagram, the second startup may include power on 270, and startup 272.

During startup 272, security data 224B may be generated. Security data 224B may be complementary to security data 224, may be a copy of security data 224, or may otherwise include information usable to perform a validation in combination with copy of security data 224A. For example, in a scenario in which both copy of security data 224A and security data 224B are hash values, the hash values may be compared to perform a validation (e.g., matching values indicate that the corresponding delayed write 260 is valid/should be trusted). It will be appreciated that security data 224B and copy of security data 224A may be similar or different, depending on the cryptographic validation algorithm selected for use. Further, while described with respect to a copy, it will be understood that the copy of security data 224A may be a data structure that is based on security data 224 and may not be a duplicative copy. Rather, copy of security data 224A and security data 224B may include similar or different information usable to ascertain whether it is likely that the same entity that generated copy of security data 224A also generated security data 224B.

For example, if memory module 206 is moved from a host data processing system to a second data processing system, then the security data generated by the second data processing system during the second startup may indicate that the copy of security data 224A was not generated by it and, consequently, should not be trusted.

After security data 224B is generated, memory module 206 may send a notification (e.g., to a startup management entity such as a basic input output system (BIOS), or entity hosted/used by the BIOS) indicating that delayed write 260 is present. Upon receipt, the startup management entity may perform a validation using security data 224B (e.g., by retrieving the copy of security data 224A or by providing a copy of security data 224B to memory module 206 with instructions to perform a comparison with copy of security data 224A). Based on the outcome of the validation, the startup management entity may send instructions to memory module 206 to either implement delayed write 260 (e.g., in a scenario in which the validation is successful) or to discard delayed write 260 (e.g., in a scenario in which the validation fails) without implementing it thereby retaining the current operation of memory module 206.

Turning to FIG. 2E, a third data flow diagram in accordance with an embodiment is shown. In the diagram, a process of implementing a delayed write is shown. The implementation may be performed after the startup shown in FIG. 2D and when the validation of the delayed write is successful.

As seen in the diagram, when instructions indicating that the delayed write is to be implemented are received, then memory module 206 may store (e.g., write) information in runtime secure registers 230. The information may replace existing information or may be supplemental information. Delayed write 260 may include information (or may otherwise be inferred) regarding where to (or where it is desirable to write) write the contents of delayed write 260 in runtime secure registers 230. By storing operation data 262 at particular locations and/or with certain labeling in runtime secure registers 230, the operation of memory module 206 may be modified.

For example, memory module 206 may use the information in runtime secure registers 230 to define its operation. When memory module 206 is initialized, it may read various portions of data from runtime secure registers 230 and set the operation of memory module 206 based on the read information. Once stored in runtime secure registers 230, delayed write 260 and copy of security data 224A may be discarded.

While not illustrated in FIG. 2E, it will be appreciated that, depending on the architecture of memory module 206, writing data to runtime secure registers 230 may include various steps such as unlocking runtime secure registers 230, reading various portions of data from runtime secure registers 230, and securing runtime secure registers 230 after storing operation data 262 in runtime secure registers 230. For example, the management entity may restrict access to runtime secure registers 230 with a password or scheme such that, during runtime, the contents of runtime secure registers 230 may be immutable.

Thus, as seen in FIGS. 2C-2E, embodiments disclosed herein may facilitate updating of the operation of hardware components such as memory modules. By doing so, embodiments disclosed herein may facilitate updates of the operation of hardware devices even when management components such as out of band management controllers are unavailable and/or sideband/out of band communications with the hardware devices are unavailable.

As discussed above, the components of FIG. 1 may perform various methods to increase the likelihood of data processing systems being able to provide computer implemented services by updating the operation of hardware devices which may otherwise prevent performance of the desired computer implemented services. FIGS. 3A-3B illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3A, a flow diagram illustrating a method of performing a startup of a data processing system in accordance with an embodiment is shown. The method may be performed, for example, by a data processing system, a startup manager, and/or other components illustrated in FIGS. 1-2E.

At operation 300, a startup of the data processing system is identified. The startup may be identified, for example, based on the data processing system being powered on, restarted, power cycled, initialized, or otherwise initiating performance of the startup.

At operation 302, during the startup, security data is generated. The security data may be generated by, for example, (i) performing a cryptographic algorithm to generate the security data using a code base that may be cryptographically validated, (ii) receiving the security data from another device (e.g., such as a data processing system that operates as part of a control plane), and/or (iii) via other methods.

In an embodiment, the security data comprises a hash, a certificate, a key, and/or another type of cryptographic data usable to perform validations in combination with subsequently obtained cryptographic data. The cryptographic validation may be any type of validation and may operate in accordance with, for example, symmetric-key cryptography, public-key cryptography, cryptographic hash functions, and/or other methodologies.

Once generated, the security data may be stored for later use. For example, the security data may be stored in a particular location.

At operation 304, after completion of the startup, management of the data processing system is handed off to a management entity. The handoff may be performed by loading various images (e.g., software images) into memory and initiating execution of computer instructions from the images. A startup management entity may terminate or suspend execution following handoff.

At operation 306, update data for a memory module is obtained. The update data may be obtained by receiving it from another device or reading it from storage. The update data may be usable to update the operation of the memory module. For example, the update data may be formatted and include informational content that when read from certain storage locations by the memory module causes the memory module to update its operation consistently with the informational content of the data. The update data may be usable to establish other data structures which may be used to update the operation of the memory module.

At operation 308, a write operation to the memory module is executed using the update data and the security data. The write operation may place a delayed write in storage of the memory module.

For example, the write operation may be directed to a shadow register (or other type of non-volatile storage) of the memory module. The write operation may be an instruction to write the update data and/or data based on the update data to one or more secure registers of the memory module. Information regarding locking and/or unlocking the secure registers of the memory module may also be written along with the delayed write. The information may maintain a security of the memory module during runtime. For example, the information may indicate that during startup the secure registers are to be unlocked, written to, and then secured (e.g., locked with secret).

The method may end following operation 308.

Using the method illustrated in FIG. 308, a memory module may be placed in condition for updating during a subsequent update.

Turning to FIG. 3B, a flow diagram illustrating a method of performing a subsequent startup of a data processing system in accordance with an embodiment is shown. The method may be performed, for example, by a data processing system, a startup manager, and/or other components illustrated in FIGS. 1-2E.

At operation 310, a startup of the data processing system is identified. The startup may be identified, for example, based on the data processing system being powered on, restarted, power cycled, initialized, or otherwise initiating performance of the startup.

At operation 312, during the startup, second security data is generated (e.g., in a similar manner to the security generated at operation 302 in FIG. 3A). The second security data may be generated by, for example, (i) performing a cryptographic algorithm to generate the second security data using a code base that may be cryptographically validated, (ii) receiving the second security data from another device (e.g., such as a data processing system that operates as part of a control plane), and/or (iii) via other methods.

Generally, the second security data may be complementary or otherwise usable to in combination with the security data obtained in operation 302 to perform a validation with respect to whether a delayed write was place in storage of a memory module hosted by the data processing system and by the data processing system. For example, both the security data and second security data may be hash values generated using the same hash function.

At 314, after the second security data is generated, a determination is made regarding whether any delayed writes are stored in a memory module. The determination may be made by (i) reading from the memory modules, (ii) receiving notifications from the memory module regarding whether delayed writes are present, and/or via other methods. For example, the memory module may, as part of the startup, may generate and send a notification of a delayed write is present in its storage.

If it is determined that a delayed write is in the storage of the memory module, then the method may proceed to operation 316. Otherwise, the method may end following operation 314.

At operation 316, a determination is made regarding whether the delayed write is valid. The determination may be made using security data stored in the memory module and associated with the delayed write and the second security data. For example, the security data and second security data may be compared for matching purposes, may be subjected to algorithmic analysis to ascertain whether a link is present that indicates that the data processing system generated both pieces of security data, etc.

If it is determined that the delayed write is valid, then the method may proceed to operation 318. Otherwise, the method may proceed to operation 322.

At operation 318, execution of the delayed write is initiated. The execution may be initiated by sending instructions to the memory module to implement the delayed write. The instructions may indicate, for example, that secure registers of the memory module are to be unlocked, that the delayed write to the unlocked secure registers is to be performed, and then that the unlocked secured registers are to be relocked. The memory module may follow the instructions thereby writing the delayed write to the secure registers.

At operation 320, use of the data written by the delayed write is initiated. For example, the memory module (and/or data processing system itself) may be (re)initialized, restarted, etc. Doing so may cause the memory module to read the data written in operation 318 to the secure register and update operation of the memory module based on the written data.

The method may end following operation 320.

Following operation 320, the data processing system may complete the startup and handoff operation to the management entity which may cause computer implemented services to be provided in a manner with reduced risk of impairment (e.g., reduction in efficiency of operation, inoperability, errors in operation, etc.) due to undesired operation of the memory module. As part of this process, the delayed write and/or copy of the security data may be cleared from the memory module by sending instructions (which may be part of previously received instructions to implement the delayed write) to the memory module that indicate that the delayed write should be deleted from storage. The memory module may clear the delayed write and/or security data in response to the instructions.

Returning to operation 316, the method may proceed to operation 322 following operation 316 when it is determined that the delayed write is not valid.

At operation 322, the delayed write is cleared. The delayed write may be cleared from the memory module by sending instructions to the memory module that indicate that the delayed write should be deleted from storage without implementing the delayed write. The memory module may clear the delayed write in response to the instructions.

The method may end following operation 322.

Using the method illustrated in FIG. 3B, embodiments disclosed herein may update operation of a memory module during a secure phase of operation of the data processing system. For example, by implementing a delayed write during startup, only validated operations may be executed thereby reducing the risk of introducing malicious information into the secured registers of the memory module.

While described with respect to a memory module, it will be understood that update data usable to update other types of hardware devices may be obtained and used throughout the methods shown in FIGS. 3A-3B. In such scenarios, other types of devices (e.g., storage devices, processing devices, etc.) may be updated.

Figure 4:
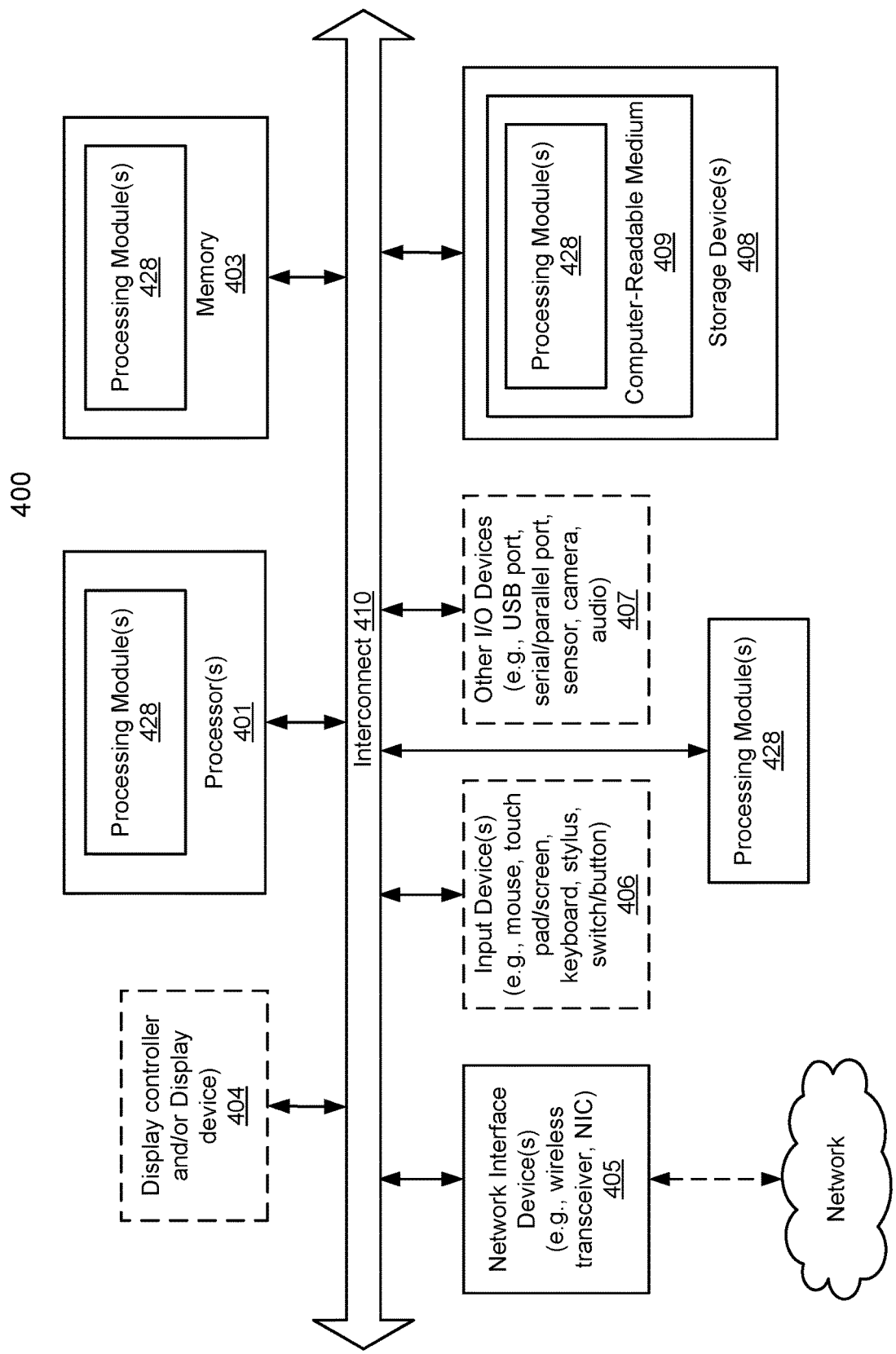
FIG. 4 shows a block diagram illustrating a computing device in accordance with an embodiment.

Any of the components illustrated in FIGS. 1-2E may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft Mac OS®/iOS® from Apple, Android® from Google °, Linux °, Unix °, or other real-time or embedded operating systems such as VxWorks.

System 400 may further include 10 devices such as devices (e.g., 405, 406, 407, 408) including network interface device(s) 405, optional input device(s) 406, and other optional 10 device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method for managing operation of a data processing system, the method comprising:
   identifying a first startup of a data processing system;
   during the first startup, generating first security data;
   following the first startup and handing off management of the data processing system to a management entity, obtaining update data for a memory module of the data processing system;
   while the data processing system is managed by the management entity, executing a write operation using the update data and the first security data to place a delayed write in storage of the memory module;
   after the delayed write is in storage of the memory module, identifying a second startup of the data processing system that terminates management of the data processing system by the management entity;
   during the second startup:
   generating second security data;
   making a determination regarding whether the delayed write is valid using the second security data and a copy of the first security data in the storage of the memory module;
   in a first instance of the determination where the delayed write is valid:
   initiating execution of the delayed write to update a secure register of the memory module using the update data; and
   in a second instance of the determination where the delayed write is invalid:
   clearing the delayed write from the memory module without updating the secure register.

2. The computer-implemented method of claim 1, wherein executing a write operation comprises writing a data chunk to a shadow register of the memory module, the secure register being in a secure state after completion of the first startup.

3. The computer-implemented method of claim 2, wherein the secure register is in a writable state during at least a portion of the first startup and the second startup.

4. The computer-implemented method of claim 2, wherein the data chunk specifies an operation parameter for the memory module, and updating the secure register using the delayed write updates operation of the memory module based on the operation parameter.

5. The computer-implemented method of claim 4, further comprising:
further in the first instance of the determination where the delayed write is valid:
performing a restart of the memory module to implement the operation parameter.

6. The computer-implemented method of claim 1, wherein the secure register comprises parameters that define operational characteristics of the memory module.

7. The computer-implemented method of claim 1, wherein making the determination comprises:
comparing the second security data and the copy of the first security data.

8. The computer-implemented method of claim 7, wherein the second security data comprises one selected from a group consisting of a key, a certificate, and a hash value.

9. The computer-implemented method of claim 1, wherein during the first startup and the second startup, the data processing system executes verified computer code.

10. The computer-implemented method of claim 9, wherein when managed by the management entity, the data processing system executes at least one portion of unverified computer code.

11. The computer-implemented method of claim 1, wherein initiating the execution of the delayed write to update the secure register of the memory module using the update data comprises:
transitioning the secure register from a locked state to a writable state;
while the secure register is in the writable state, writing to the secure register using the update data; and
after the writing to the secure register, clearing the delayed write from the storage.

12. The computer-implemented method of claim 1, wherein the management entity comprises an operating system.

13. The computer-implemented method of claim 12, wherein the first startup and the second startup are managed by a startup management entity.

14. The computer-implemented method of claim 13, wherein the startup management entity comprises a basic input output system.

15. A non-transitory machine-readable medium having instructions stored therein, which when executed by a processor, cause a data processing system to perform operations for managing operation of a data processing system, the operations comprising:
identifying a first startup of a data processing system;
during the first startup, generating first security data;
following the first startup and handing off management of the data processing system to a management entity, obtaining update data for a memory module of the data processing system;
while the data processing system is managed by the management entity, executing a write operation using the update data and the first security data to place a delayed write in storage of the memory module;
after the delayed write is in storage of the memory module, identifying a second startup of the data processing system that terminates management of the data processing system by the management entity;
during the second startup:
generating second security data;
making a determination regarding whether the delayed write is valid using the second security data and a copy of the first security data in the storage of the memory module;
in a first instance of the determination where the delayed write is valid:
initiating execution of the delayed write to update a secure register of the memory module using the update data; and
in a second instance of the determination where the delayed write is invalid:
clearing the delayed write from the memory module without updating the secure register.

16. The non-transitory machine-readable medium of claim 15, wherein executing a write operation comprises writing a data chunk to a shadow register of the memory module, the secure register being in a secure state after completion of the first startup.

17. The non-transitory machine-readable medium of claim 16, wherein the secure register is in a writable state during at least a portion of the first startup and the second startup.

18. A data processing system, comprising:
a processor; and
a memory coupled to the processor to store instructions, which when executed by the processor, cause the processor to perform operations for managing operation of the data processing system, the operations comprising:
identifying a first startup of a data processing system;
during the first startup, generating first security data;
following the first startup and handing off management of the data processing system to a management entity, obtaining update data for a memory module of the data processing system;
while the data processing system is managed by the management entity, executing a write operation using the update data and the first security data to place a delayed write in storage of the memory module;
after the delayed write is in storage of the memory module, identifying a second startup of the data processing system that terminates management of the data processing system by the management entity;
during the second startup:
generating second security data;
making a determination regarding whether the delayed write is valid using the second security data and a copy of the first security data in the storage of the memory module;
in a first instance of the determination where the delayed write is valid:
initiating execution of the delayed write to update a secure register of the memory module using the update data; and
in a second instance of the determination where the delayed write is invalid:
clearing the delayed write from the memory module without updating the secure register.

19. The data processing system of claim 18, wherein executing a write operation comprises writing a data chunk to a shadow register of the memory module, the secure register being in a secure state after completion of the first startup.

20. The data processing system of claim 19, wherein the secure register is in a writable state during at least a portion of the first startup and the second startup.

* * * * *